F. KOSS.
FILTERING FAUCET.
APPLICATION FILED JULY 11, 1910.

982,434.

Patented Jan. 24, 1911.

Witnesses
Albert A. Hofmann.
William T. Hewitt.

Inventor
Frank Koss.
By Edward N. Pagelsen.
Attorney

UNITED STATES PATENT OFFICE.

FRANK KOSS, OF DETROIT, MICHIGAN, ASSIGNOR OF ONE-HALF TO GOTTFRIED PRIMA, OF DETROIT, MICHIGAN.

FILTERING-FAUCET.

982,434. Specification of Letters Patent. Patented Jan. 24, 1911.

Application filed July 11, 1910. Serial No. 571,281.

*To all whom it may concern:*

Be it known that I, FRANK KOSS, a citizen of the United States, and a resident of Detroit, in the county of Wayne and State of Michigan, have invented a new and useful Filtering-Faucet, of which the following is a specification.

This construction relates to simple means for removing impurities from water and other liquids, and the object of my invention is to provide a faucet with an easily replaceable and easily cleaned filter.

Figure 1:
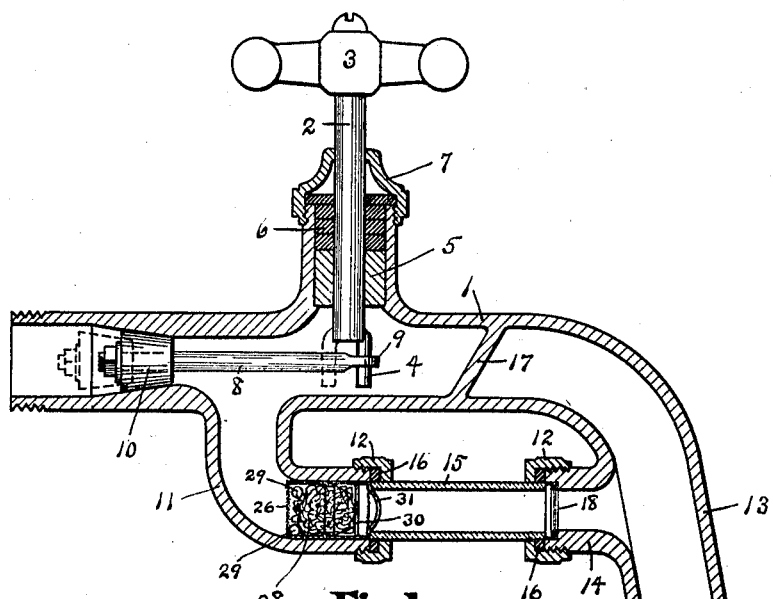
Figure 2:
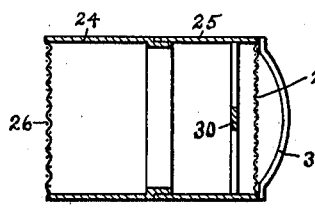
Figure 3:
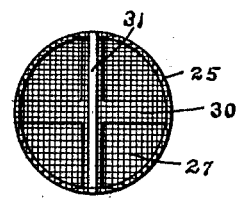
Figure 4:
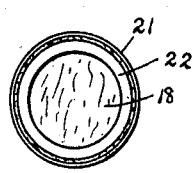
Figure 5:
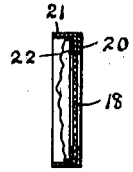

In the accompanying drawing, Figure 1 is a vertical longitudinal section of my improved filtering faucet. Fig. 2 is a longitudinal section of one of the filtering devices employed, on a large scale. Fig. 3 is an end view of the same. Fig. 4 is an elevation and Fig. 5 is a cross section of the other filtering device on the same large scale.

Similar reference characters refer to like parts throughout the several views.

The body 1 of the filtering faucet is preferably of cast brass and much like the ordinary faucets now on the market in general appearance, although it may be changed to conform to any design. One end may be screw-threaded to connect with the pipes from the liquid source. The stem 2 may have any desired handle 3 at its upper end and is provided with a crank pin 4 at its inner end. A ring 5 is tightly held in the body of the valve and furnishes a bearing for the stem. Packing 6 of any desirable character may be held in place by the cap 7.

A valve-rod 8 is formed with a ring 9 at its inner end, which ring receives the crank pin 4. On the outer end of the rod is secured the tapering valve 10, preferably of rubber, which is adapted to control the flow of the liquids through the body. Extending down from the body is an elbow 11, having its outer end threaded to receive a nut 12. The discharge end 13 of the faucet also has a tubular projection 14 threaded to receive a nut 12. A glass tube 15 is held in place between the elbow and the projection 14 by these nuts, the washers 16 insuring a tight joint. A transverse wall 17 in the body forces the liquid to flow through the glass tube.

Two removable filtering devices are shown in the drawing, one at each end of the glass tube, and while either may be omitted, the use of both is desirable. At the discharge end of the glass tube I prefer to secure a web 18 of woven fabric, silk preferred, held in position in any desired manner. By forming an outer ring with a radial flange 20 and cylindrical flange 21, and wedging the web in place by means of the flat ring 22, an easily handled filtering device is constructed. The rings and web are placed in the small counter-bore of the projection 14 as shown in Fig. 1. At the inlet end of the glass tube is mounted another filtering device. A shell is formed in any desirable manner, such as by two rings 24 and 25, connecting as shown in Fig. 2. The ends of the shell are closed by fine screens, preferably of woven wire, the inlet screen 26 being slightly coarser than the discharge screen 27. Within the shell may be placed a filter 28 of any desired material, sponges made of silk fibers preferred. To prevent the fibrous filter-material being washed against the screens, any proper device may be employed. In Fig. 1, small pellets 29 are shown, while in Figs. 2 and 3, a guard 30 in the form of a cross is shown. To facilitate the removal of the filter from the elbow, a small wire loop or bail 31 may be secured to the same.

It will be noticed that the nuts 12 can be unscrewed, the glass tube 15 removed and both filters taken out whenever desired. The fabric 18 can be easily replaced. The rings 24 and 25 are easily separated and the sponge 28 removed, when the rings and screens 26 and 27 can be boiled. A new fibrous filter is then inserted and all the parts positioned. The sizes of the different parts can all be changed as desired, all that is necessary is that the distance between the parts 11 and 14 be slightly greater than the length of the shell shown in Fig. 2.

Having now explained my improvements, what I claim as my invention and desire to secure by Letters Patent is;—

1. In a filtering faucet, the combination of a hollow body having one end turned down and having an interior wall separating it into two chambers, a stem projecting from the upper side of the body, bearings for the stem mounted in the body, a crank at the lower end of the stem, a valve mounted at the inlet end of the body, a rod connecting said valve and crank, and a filtering device wherethrough a liquid may pass from one chamber of the faucet to the other.

2. In a filtering faucet, the combination of a hollow body, having an interior wall dividing the same into chambers and having tubular projections, one for each chamber, filtering means mounted in said projections and a tube connecting said projections, a valve in one chamber, and means to position the valve to control the admission of liquids.

3. In a filtering-faucet, the combination of a body having inlet and discharge openings, a valve to control the flow of liquids therethrough, tubular projections on the lower side of the body between said openings, a removable tube between said projections, a filtering device at the inlet end of said tube comprising a cylindrical body, a woven wire screen at each end of the same, and a sponge within the cylinder, and a filter at the discharge end of the tube comprising a woven fabric and means to secure the same in position.

In testimony whereof, I have signed my name to this specification in the presence of two subscribing witnesses.

FRANK KOSS.

Witnesses:
I. G. HOWLETT,
E. N. PAGELSEN.